United States Patent [19]

Ohkumo

[11] Patent Number: 4,803,900
[45] Date of Patent: Feb. 14, 1989

[54] TRANSMISSION RATIO CONTROL SYSTEM FOR A CONTINUOUSLY VARIABLE TRANSMISSION

[75] Inventor: Hiroya Ohkumo, Koganei, Japan

[73] Assignee: Fuji Jukogyo Kabushiki Kaisha, Tokyo, Japan

[21] Appl. No.: 944,837

[22] Filed: Dec. 22, 1986

[30] Foreign Application Priority Data

Dec. 23, 1985 [JP] Japan .................................. 60-289791

[51] Int. Cl.$^4$ .............................................. B60K 41/18
[52] U.S. Cl. ......................................... 74/866; 74/867; 364/424.1
[58] Field of Search ........................ 74/867, 868, 866; 364/424.1; 474/11, 12, 18, 28

[56] References Cited

U.S. PATENT DOCUMENTS

| 4,387,608 | 6/1983 | Mohl et al. ....................... 474/12 X |
| 4,522,086 | 6/1985 | Haley ............................... 474/18 X |
| 4,590,561 | 5/1986 | Abo et al. .......................... 74/866 X |
| 4,612,828 | 9/1986 | Ide et al. ........................... 74/868 X |
| 4,631,043 | 12/1986 | Tokoro et al. .......................... 474/18 |
| 4,638,689 | 1/1987 | Sakai .................................... 74/866 |
| 4,641,553 | 2/1987 | Kobayashi ............................ 74/866 |
| 4,644,827 | 2/1987 | Takano et al. ..................... 474/18 X |
| 4,649,486 | 3/1987 | Oshiage ............................. 474/11 X |
| 4,657,522 | 4/1987 | Miyawaki ......................... 74/866 X |
| 4,663,991 | 5/1987 | Nakamura et al. ............... 74/866 X |
| 4,701,853 | 10/1987 | Osanai .............................. 74/866 X |

FOREIGN PATENT DOCUMENTS 2158898 11/1985 United Kingdom .................. 474/11

Primary Examiner—Dirk Wright
Assistant Examiner—David Novais
Attorney, Agent, or Firm—Martin A. Farber

[57] ABSTRACT

A control system for a continuously variable transmission has a transmission ratio control valve having a spool for controlling oil supplied to a cylinder of a drive pulley to change the transmission ratio. The control system operates to control the transmission ratio in accordance with a desired ratio. The desired ratio is increased at rapid deceleration of a vehicle to increase actual transmission ratio so that the transmission ratio reaches a maximum ratio before the vehicle stops.

9 Claims, 7 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at rapid deceleration of the vehicle.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to the drive pulley through a clutch. The line pressure is controlled to prevent the belt from slipping on the pulleys in order to transmit the output of the engine.

When starting the vehicle, the transmission ratio is set at a maximum value. When an accelerator pedal is depressed and engine speed becomes higher than a set value, the clutch is engaged to start the vehicle. When the vehicle speed and engine speed increase along a maximum transmission ratio line $l_L$ and reach set values under a driving condition, the transmission ratio starts to change (to upshift) at a point A of FIG. 5. At that time if the engine speed is kept constant, the transmission ratio is automatically and continuously reduced at a speed along a line $l_U$ and finally reaches a minimum transmission ratio line $l_H$. When the accelerator pedal is released, engine speed and vehicle speed reduce along the line $l_H$. When both speeds reach a point B, the transmission ratio begins to increase. Thus, the transmission ratio is increased (downshifted) along a line $l_D$ and reaches the maximum transmission ratio line $l_L$.

In such a transmission, when the vehicle is rapidly decelerated, the vehicle is stopped before the transmission ratio reaches the maximum ratio line $l_L$. A dotted line $l_1$ in FIG. 5. shows the variation of the transmission ratio at a rapid deceleration. When the belt stops when the vehicle is stopped, the movable conical discs can not be shifted in the downshift direction, because of large friction between the belt and discs. As a result, the belt stays in a lower ratio position lower than the maximum transmission ratio position. In such a state, when the clutch is engaged in order to re-start the vehicle, the pulleys being to rotate. At that time, the movable conical discs are quickly shifted to move the belt to the maximum ratio position. Due to the movement of the belt, starting of the vehicle is delayed and the quick shifting of the discs causes wearing of the belt.

SUMMARY OF THE INVENTION

The object of the present invention is to provide a system which may quickly downshift the transmission at rapid deceleration of a vehicle.

To this end, in accordance with the present invention, a desired transmission ratio is increased to a large ratio when the magnitude of deceleration is larger than a set value.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a hydraulic circuit having a pump for supplying oil to the first and second cylinders through the transmission ratio control valve.

The system further comprises detecting means for detecting load on the engine and for producing a load signal, first means responsive to the load signal for producing a desired transmission ratio signal, second means responsive to the desired transmission ratio signal for shifting the spool of the transmission ratio control valve so as to provide a transmission ratio, detecting means for detecting rapid deceleration of the vehicle and producing a deceleration signal, third means responsive to the deceleration signal for increasing the desired transmission ratio so as to increase the actual transmission ratio.

The other objects and features of this invention will become understood from the following description with reference to the accompanying drawings.

DETAILED DESCRIPTION OF THE PREFERRED EMBODIMENT

Figure 1:
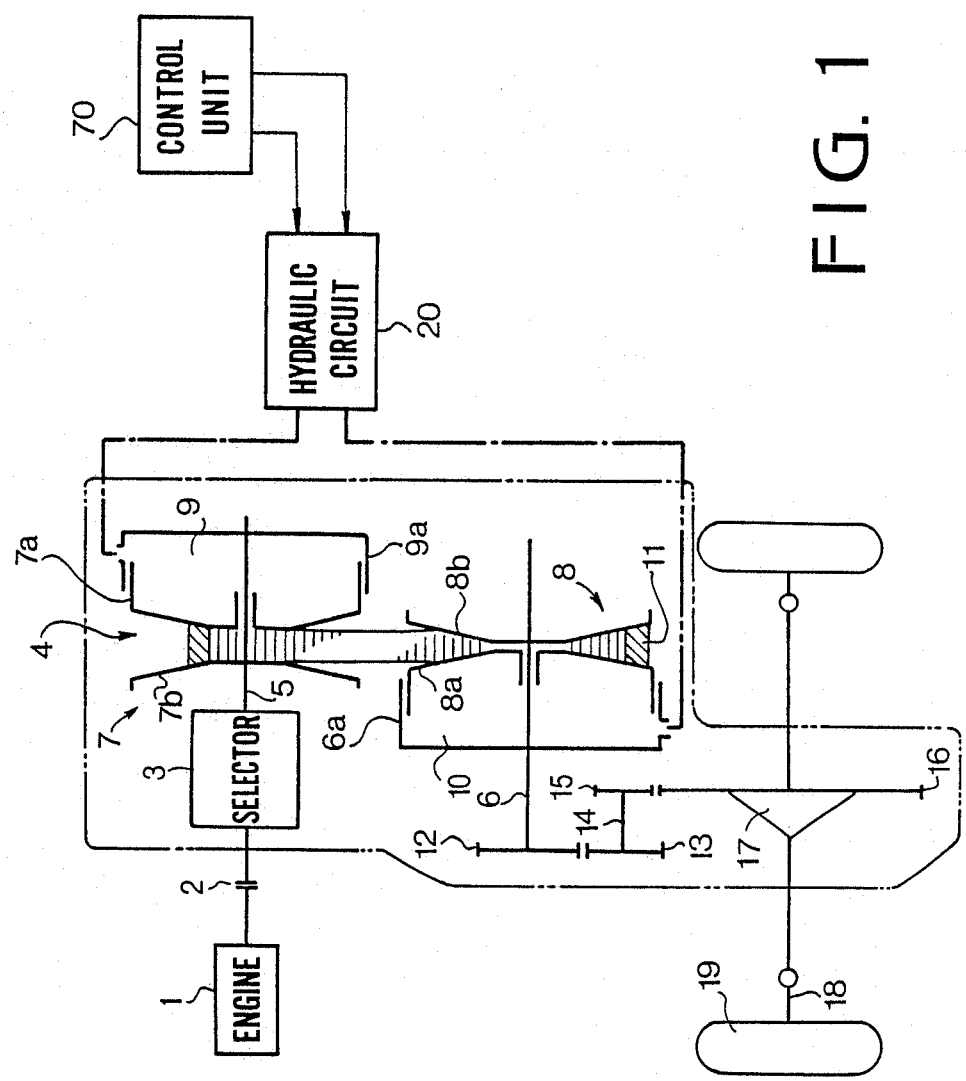
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
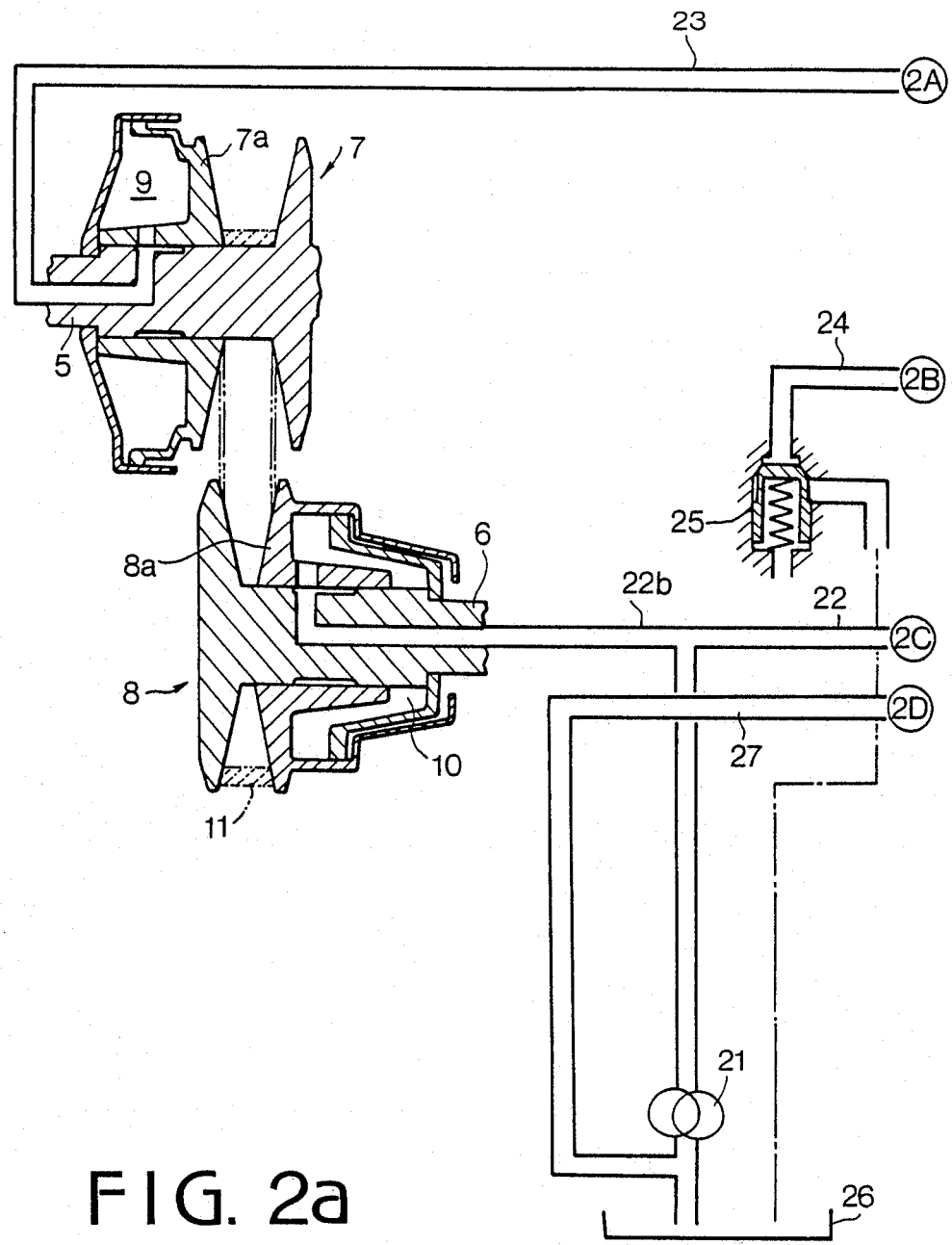
FIGS. 2a and 2b are schematic diagrams showing a control system according to the present invention.
Figure 2B:
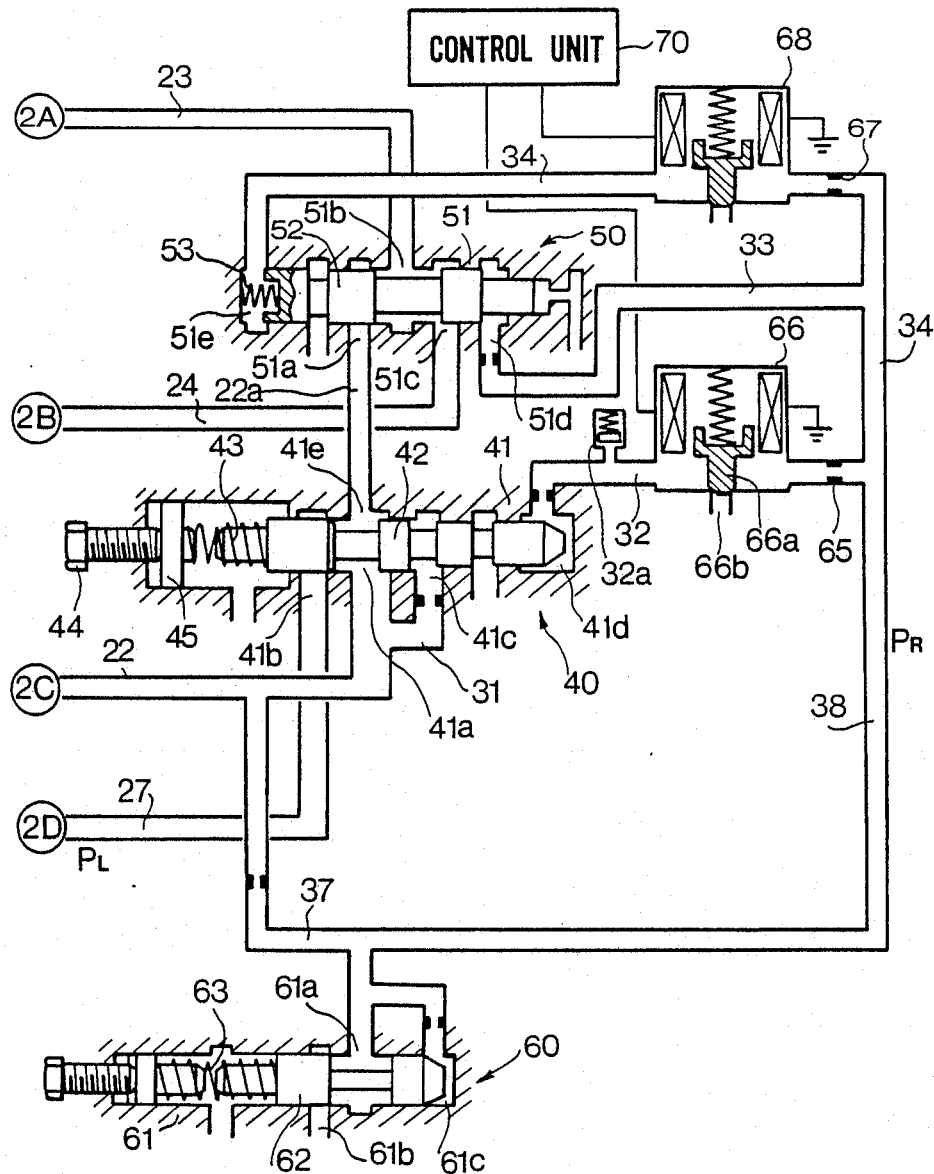

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, a transmission ratio control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. Port 51b communicates with the chamber 9 through conduit 23, and the port 51a communicates with port 41e of the line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, An inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to the chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed (rate) of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
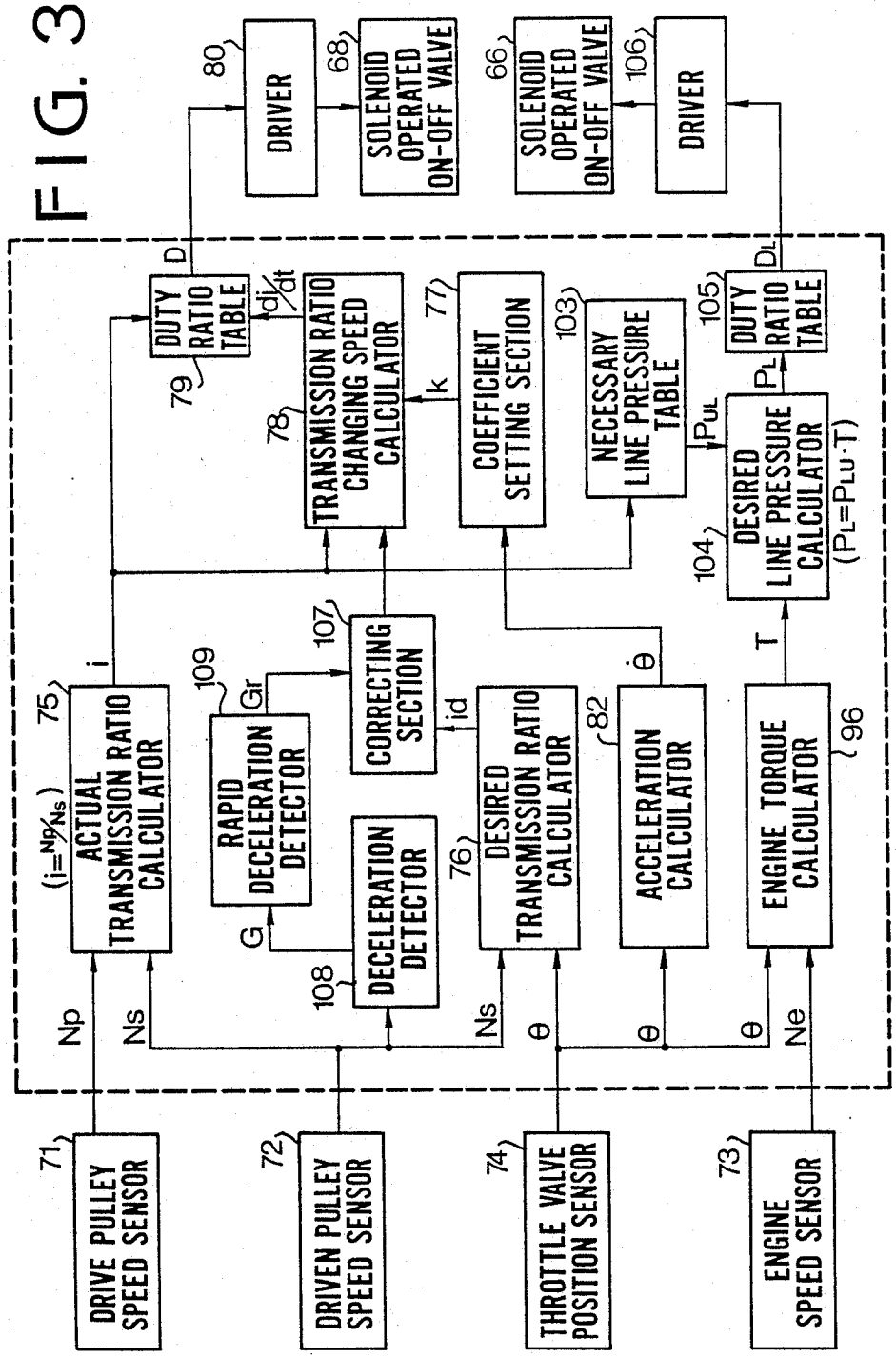
FIG. 3 is a block diagram showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle position sensor 74 are fed to a desired transmission ratio calculator 76. The desired transmission ratio id is calculated by the calculator 76 in accordance with the signals $N_s$ and $\theta$. The desired transmission ratio id fed to a transmission ratio changing speed (rate) calculator 78 through a correcting section 107. On the other hand, the output $\theta$ is fed to an acceleration calculator 82 to obtain acceleration $\dot{\theta}$. The signal of the acceleration $\dot{\theta}$ is supplied to a coefficient setting section 77 to produce a coefficient K. The actual transmission ratio i, corrected value of the desired transmission ratio id and coefficient K from the coefficient setting section 77 are applied to a transmission ratio changing speed calculator 78 to produce a transmission ratio changing speed (rate) di/dt from the formula $di/dt = K(id - i)$.

The speed (rate) di/dt and actual ratio i are applied to a duty ratio table 79 to derive the duty ratio D. The duty ratio D is supplied to the solenoid operated valve 68 through a driver 80.

Further, the output signal $\theta$ of throttle position sensor 74 and the output $N_e$ of engine speed sensor 73 are fed to an engine torque calculator 96, so that engine torque T is calculated based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In the system of the present invention, the signal $N_S$ of the driven pulley speed sensor 72 is applied to a deceleration detector 108 where the actual deceleration G of the vehicle ($G = -dN_S/dt$) is detected. The deceleration G is applied to a rapid deceleration detector 109 where the deceleration G is compared with a predetermined reference $G_1$ and produces a rapid deceleration signal $G_r$ when G is larger than $G_1$. The signal $G_r$ is applied to correcting section 107 where a correcting value $\Delta i$ is added to the desired transmission ratio ($id + \Delta i$) thereby increasing the desired transmission ratio. When deceleration G becomes smaller than a predetermined value $G_2$ which is smaller than $G_1$, or vehicle speed becomes lower than a predetermined value, the rapid deceleration signal $G_r$ is reset.

In operation, while the vehicle is at a stop, the chamber 10 of the driven pulley 8 is supplied with line pressure through passage 22b, and the chamber 9 of the drive pulley 7 is drained, since the $N_P$, $N_S$, $\theta$ and the duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration, the desired the transmission ratio id and transmission ratio changing speed di/dt are calculated by calculators 76, 78, and the duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with the port 51b, so that oil is supplied to the chamber 9 through the conduit 23. On the other hand, the duty ratio for the valve 66 is reduced, thereby shifting the spool 42 of the valve 40 to the left. The port 41a communicates with the port 41b of the drain passage 27. Thus, the line pressure reduces, and the transmission is upshifted, since oil is still supplied to the chamber 9 through the control valve 50.

As the difference between the desired transmission ratio id and the actual transmission ratio i becomes large, the duty ratio for the valve 68 becomes large, thereby increasing the transmission ratio changing speed (rate) di/dt. When the opening degree of the throttle valve is reduced for deceleration, the duty ratio is reduced, thereby shifting the spool 52 to the right to drain the chamber 9. Thus, the transmission ratio is downshifted. The transmission changing speed (rate) at downshifting increases with reduction of the duty ratio.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4:
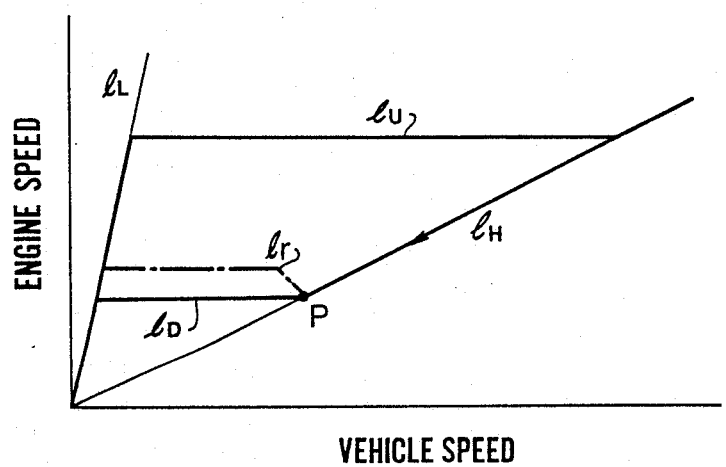
FIG. 4 is a graph showing a transmission characteristic of the control system of the invention.
Figure 5:
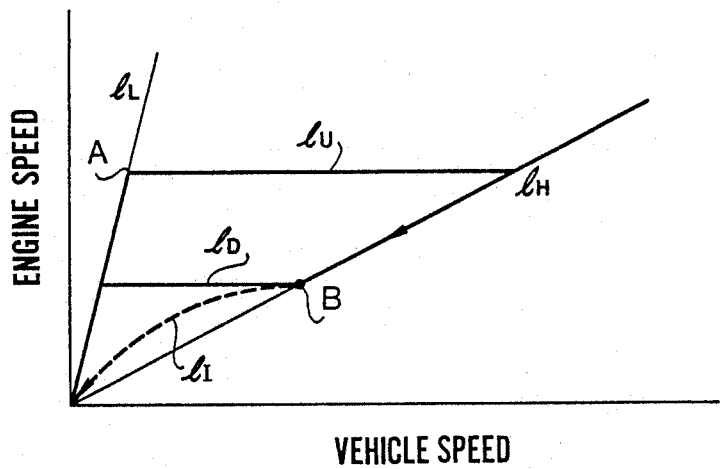
FIG. 5 is a graph showing a transmission characteristic of a conventional transmission.

When the vehicle is rapidly decelerated, and the deceleration G is larger than the reference value $G_1$, the rapid deceleration signal $G_r$ is applied to the correcting section 107 from the rapid deceleration detector 109 to add the $\Delta i$ to the desired transmission ratio ($id + \Delta i$). Thus, the desired transmission ratio is increased so that the actual transmission ratio of the transmission is increased. For example, when the vehicle is rapidly decelerated at a point P in FIG. 4, the actual transmission ratio of the transmission changes as shown by a chain line $l_r$. Accordingly, the transmission is downshifted at a higher engine speed, so that the transmission ratio reaches the maximum ratio (line 1L) at higher engine speed and vehicle speed. Moreover, the transmission ratio changing speed (rate) is increased by the increase of the desired transmission ratio, thereby quickly downshifting the transmission to the maximum value. Thus, the transmission ratio reliably reaches the maximum ratio (line 1L) before the vehicle stops. The correcting value $\Delta i$ can be adjusted in accordance with the magnitude of the deceleration G so as to increase the transmission ratio.

Figure 6:
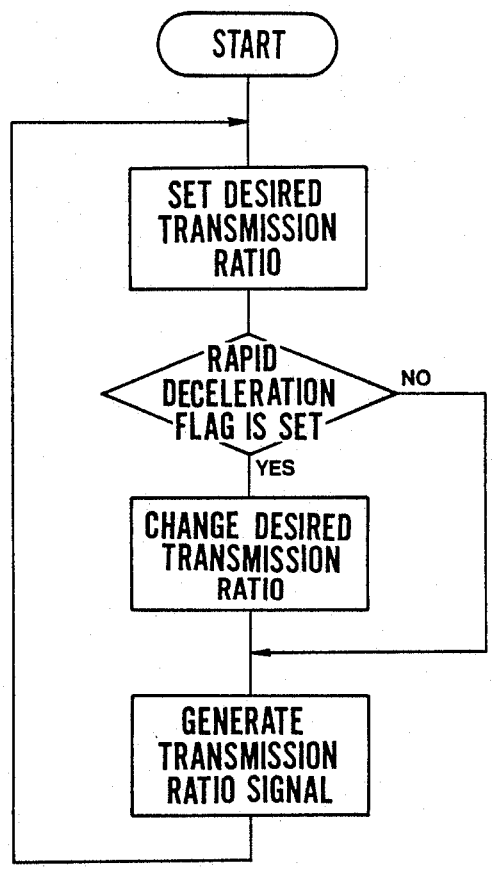
FIGS. 6 and 7 are flowcharts showing the operation of the system.
Figure 7:
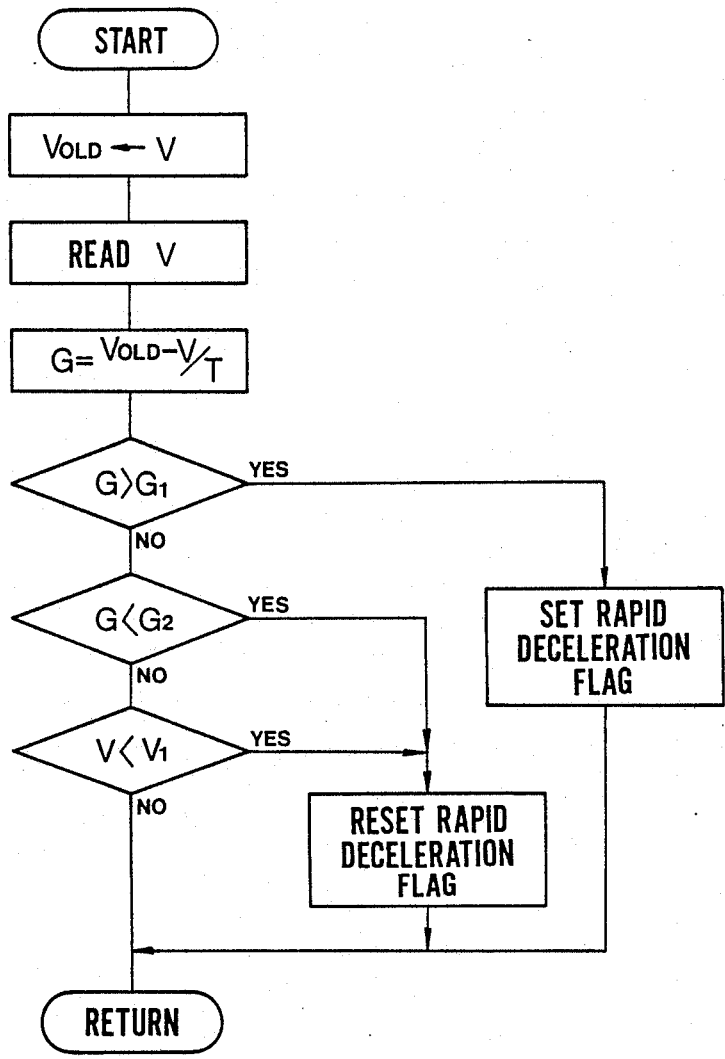

FIG. 6 shows the operation of the change of the transmission ratio. The detection of rapid deceleration is executed by an interrupt routine shown in FIG. 7. In FIG. 7, V is vehicle speed and T is interval of the interrupt.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system including a transmission ratio control valve having ports and a spool, a first hydraulic circuit having a pump for supplying oil to the first hydraulic cylinder through the transmission ratio control valve and to the second hydraulic cylinder, the improvement in the control system comprising:

detecting means for detecting load on the engine and for producing a load signal corresponding to the load;

first means responsive to the load signal for producing a desired transmission ratio signal corresponding to a desired transmission ratio;

second means responsive to the desired transmission ratio signal for shifting the spool of the transmission ratio control valve so as to provide the transmission with an actual transmission ratio corresponding to the desired transmission ratio;

detecting means for detecting actual rapid deceleration of the vehicle above a predetermined value of rapid deceleration and producing a deceleration signal when said actual rapid deceleration is above said predetermined value;

third means responsive to the deceleration signal for increasing the desired transmission ratio to a value larger than the desired transmission ratio represented by the desired transmission ratio signal produced by the first means so as via said second means to increase the actual transmission ratio to a value corresponding to the increased value of the desired transmission ratio.

2. The control system according to claim 1 wherein the second means includes a second hydraulic circuit for supplying oil to the transmission ratio control valve so as to shift the spool and control valve means provided in the second hydraulic circuit for controlling the amount of oil supplied to the transmission ratio control valve.

3. The control system according to claim 2 further comprising sensing means for sensing operating conditions of the engine and the transmission and for producing operating conditions signals dependent on the conditions, control means responsive to the operating condition signals from the sensing means and to the load signal for producing an output signal for operating the control valve means, so tha the shifting of the spool is controlled to control the transmission ratio changing speed dependent on the desired transmission ratio.

4. The control system according to claim 3 wherein the control valve means is a solenoid operated on-off valve, and the output signal of the control means is pulses the duty ratio of which is changed so as to control the transmission ratio changing speed.

5. The control system according to claim 3 wherein the second hydraulic circuit is provided with a regulator valve for maintaining the pressure of oil at a constant value.

6. In a control system for a continuously variable transmission for transmitting the power of an internal combustion engine having a throttle valve to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a transmission ratio control valve having ports and a shiftable spool, and a first hydraulic circuit having a pump for supplying oil to the first hydraulic cylinder via the transmission ratio control valve and to said second hydraulic cylinder, the improvement in the system comprising:

sensor means for sensing operating conditions of said engine and for producing a corresponding first signal;

first means responsive to the first signal for determining a desired transmission ratio;

second means responsive to the desired transmission ratio for shifting the spool of the transmission ratio control valve so as to provide an actual transmission ratio of the transmission corresponding to the desired transmission ratio;

detecting means for detecting actual rapid deceleration of the vehicle above a predetermined value of rapid deceleration and producing a rapid deceleration signal when said actual rapid deceleration is above said predetermined value; and third means responsive to the rapid deceleration signal for increasing the desired transmission ratio so as via the second means to increase the actual transmission ratio.

7. A control system according to claim 6, wherein said third means is responsive to the rapid deceleration signal for increasing the desired transmission ratio so as via the second means to increase the actual transmission ratio with engine speed initially increasing and thereafter with engine speed remaining constant until a maximum transmission ratio of the transmission is reached without the vehicle stopping.

8. In a control system for a continuously variable transmission, having continuously variable actual transmission ratios including a maximum transmission ratio, for transmitting power of an internal combustion engine including a throttle valve to driving wheels of a motor vehicle through a clutch, the transmission having a drive pulley including a hydraulically shiftable first disc and a first hydraulic cylinder for operating the first disc, a driven pulley including a hydraulically shiftable second disc and a second hydraulic cylinder for operating the second disc, and a belt engaged with both pulleys, the control system having a transmission ratio control valve having ports and a spool, the system including a first hydraulic circuit having a pump for supplying oil to the first hydraulic cylinder through the transmission ratio control valve and to the second hydraulic cylinder, vehicle speed detecting means responsive to rotational speed of the driven pulley for detecting vehicle speed, throttle valve position detecting means responsive to an opening degree of the throttle valve, desired transmission ratio determining means responsive to the vehicle speed and the opening degree of the throttle valve for determining a desired transmission ratio, transmission ratio changing speed deciding means responsive to the difference between the desired transmission ratio and the actual transmission ratio of the transmission for determining a transmission ratio changing speed, and means responsive to the transmission ratio changing speed for shifting the spool so the actual transmission ratio of the transmission changes at said transmission ratio changing speed to the desired transmission ratio, the improvement of the system which comprises:

deceleration detecting means responsive to the vehicle speed for calculating a decrease of the vehicle speed during a predetermined time for detecting actual deceleration of the vehicle when the vehicle speed is higher than a predetermined speed;

rapid deceleration detecting means responsive to the actual deceleration for producing a rapid deceleration signal when the actual deceleration is higher than a first predetermined deceleration value and for cancelling the rapid deceleration signal when the actual deceleration is lower than a second predetermined deceleration value lower than the first predetermined deceleration value;

correcting means responsive to the rapid deceleration signal for adding a correcting value to the desired transmission ratio determined by the desired transmission ratio determining means to provide a corrected desired transmission ratio, so as to change the actual transmission ratio of the transmission to the maximum transmission ratio before the vehicle stops at an increased transmission ratio changing speed corresponding to the corrected desired transmission ratio.

9. A control system according to claim 8, wherein said correcting value is a function of the magnitude of the actual deceleration.

* * * * *